United States Patent Office 3,198,818
Patented Aug. 3, 1965

3,198,818
PROCESS FOR SEPARATING ORGANOTIN COMPOUNDS
John E. Santo, Jackson Heights, N.Y., assignor, by mesne assignments, to M. T. Chemicals Inc., New York, N.Y., a corporation of Delaware
No Drawing. Filed Aug. 22, 1960, Ser. No. 50,827
12 Claims. (Cl. 260—429.7)

This invention relates to a process for preparing pure organotin compounds.

In the synthesis of organotin compounds, the mixture of reaction products usually contains tetrahydrocarbontin and trihydrocarbontin compounds. I discovered that mixtures of tetrahydrocarbontin with trihydrocarbontin compounds are separated by an extraction process utilizing methyl alcohol ($CH_3OH$) as the extractant. Tetrahydrocarbontins ($R_4Sn$) are essentially insoluble in methyl alcohol. Trihydrocarbontins, having the formula $R_3SnX$, wherein X is chloride, hydroxide (OH) or a group having the formula $OSnR_3$, are soluble in methyl alcohol. R is selected from the group consisting of alkyl and aryl radicals of two or more carbon atoms. Different R groups may be bonded to the same tin atom. Large R groups such as the lauryl group are contemplated within the scope of the invention, although due to availability of raw materials, it is not contemplated that R would be a group larger than the octadecyl group. The preferred R groups are those having from two to eight carbon atoms and include ethyl, butyl, benzyl, octyl and phenyl.

In its simplest aspect, the extraction process is carried out by mixing methyl alcohol with the mixtures of compounds to be separated. The trihydrocarbontins dissolve in the methyl alcohol. The insoluble tetrahydrocarbontin is a separate phase. The extraction technique is conventional. It is preferred that at least two parts by volume of the methyl alcohol be utilized per part of the mixture of compounds to be separated. Larger amounts may be used dependent upon the design of the process and the particular compounds being separated. Smaller amounts may also be used. This is usual where there are a number of extractive stages, although the total methyl alcohol utilized in the various steps will usually be at least twice the total volume of the original tin compounds. The extraction may be carried out in a one-stage process, or in several stages. For large scale applications, it is possible to carry it out in a continuous countercurrent operation. The separation is relatively rapid. However, where the insoluble tetraorganotin compound is dispersed finely in the methyl alcohol, sufficient standing time is required to allow separation of the two phases. The phases may be separated more rapidly using separatory equipment.

The solubility of the trihydrocarbontins in the methyl alcohol increases with increased temperature. Most separations are carried out at room temperature; for particular separations, however, it is sometimes necessary to raise the temperature to as high as 60° C. This is illustrated in the separation of tetraphenyltin and triphenyltin chloride. Triphenyltin chloride has sufficient solubility in methyl alcohol only at temperatures above about 60° C., for utilization of the methyl alcohol as an efficient extractant.

Reaction mixtures used in the preparation of hydrocarbontin compounds will often contain a dihydrocarbontin compound as well as the tri- and tetra- compounds. Dependent on the reaction mixture, the dihydrocarbontin compounds are either the chloride or the oxide. The dihydrocarbontin dichlorides are soluble in methyl alcohol, whereas the dihydrocarbontin oxides are insoluble in methyl alcohol. When a reaction mixture contains di- and trihydrocarbontin chlorides (and possibly even mono- hydrocarbontin trichloride), and the tetrahydrocarbontin, my separation process results in the separation of the pure tetrahydrocarbontin from the hydrocarbontin chlorides which are all soluble in methyl alcohol. When the reaction mixture contains a dihydrocarbontin oxide and a bis trihydrocarbontin oxide or trihydrocarbontin hydroxide, together with the tetrahydrocarbontin compound, my separation process yields the pure bis trihydrocarbontin oxide or trihydrocarbontin hydroxide in the methyl alcohol, leaving the insoluble tetra- and di- compounds in separate phase(s). The tetrahydrocarbontin and the dihydrocarbontin oxide may be in the same or separate phases, dependent on mutual solubility, whether they are liquid or solid, etc. Due to the similarity of properties, the separation of tetrahydrocarbontins and trihydrocarbontins has until now been more difficult than the separation of tetrahydrocarbontins and dihydrocarbontins, or trihydrocarbontins and dihydrocarbontins, respectively. These other mixtures of compounds are separated utilizing the different phases present at ambient temperatures, mutual insolubilities, etc.

For the purpose of giving those skilled in the art a better understanding of the invention, the following illustrative examples are given:

A mixture of tetrabutyltin, tributyltin chloride, and dibutyltin dichloride weighing 505 g. together with 500 ml. of methyl alcohol, were added to a separatory funnel. The mixture was shaken and allowed to stand about one hour. Clear phase separation occurred. The bottom phase which contained the tetrabutyltin weighed 302 g. It was re-extracted with 250 ml. of methyl alcohol. The mixture was allowed to stand for two hours. Although tetrabutyltin has practically no solubility in methyl alcohol, a small amount initially stays in the methyl alcohol as a dispersion, which separates out on standing. The methyl alcohol extracts from the first and second stages were combined and the methyl alcohol was distilled over. The recovered tetrabutyltin weighed 302 g. and the combined weight of tributyltin chloride and dibutyltin dichloride was 185 g. Based on the original mixture, the percentage recovery of tetrabutyltin was 97.36% and for the butyltin chlorides was 100%.

Having experimentally established the feasibility of the seperatory process by controlled weight experiments, and having determined the excellent yields, I used a simplified experimental procedure for determining the applicability of the separatory process to other hydrocarbontin compounds. The simplified procedure consisted of attempting to dissolve a small amount of various compounds in methyl alcohol and thereby establishing their solubility therein. The results of these experiments established that the following compounds were insoluble in methyl alcohol: tetraethyltin, tetraoctyltin, dibutyldiphenyltin, tetraphenyltin, dioctyltin oxide, and dibutyltin oxide. The following compounds were found to be soluble in methyl alcohol: bis tributyltin oxide, bis trioctyltin oxide, triphenyltin hydroxide, triphenyltin chloride, trioctyltin chloride, triethyltin chloride, diphenyltin dichloride, and dioctyltin dichloride.

As many embodiments of this invention may be made without departing from the spirit and scope thereof, it is to be understood that the invention includes all such modifications and variations as come within the scope of the appended claims.

I claim:
1. A process for separating a mixture consisting essentially of a tetrahydrocarbontin having the formula $R_4Sn$ and a trihydrocarbontin compound having the formula $R_3SnX$, wherein R is selected from the group consisting of alkyl and aryl radicals having 2 to 18 carbon atoms and X is selected from the group consisting of chloride, hydroxide, and $OSnR_3$, comprising contacting said mixture with methyl alcohol resulting in the solution of the trihydrocarbontin compound in the methyl alcohol, and the tetrahydrocarbontin remaining in a separate phase, and then separating the two phases.

2. A process for separating a tetrahydrocarbontin from a mixture consisting essentially of a tetrahydrocarbontin and a trihydrocarbontin chloride wherein the hydrocarbon group is selected from the group consisting of alkyl and aryl radicals having 2 to 18 carbon atoms, comprising contacting said mixture with methyl alcohol resulting in the solution of the trihydrocarbontin chloride in the methyl alcohol, and the tetrahydrocarbontin in a separate phase, and then separating the two phases to obtain the tetrahydrocarbontin.

3. A process for separating a tetrahydrocarbontin from a mixture consisting essentially of a tetrahydrocarbontin and a trihydrocarbontin chloride and a dihydrocarbontin dichloride, wherein the hydrocarbon group is selected from the group consisting of alkyl and aryl radicals having 2 to 18 carbon atoms, comprising contacting said mixture with methyl alcohol to dissolve the trihydrocarbontin chloride and dihydrocarbontin dichloride and leaving the tetrahydrocarbontin in a separate phase, and then separating the two phases to obtain the tetrahydrocarbontin.

4. A process for separating tetrabutyltin from a mixture consisting essentially of tetrabutyltin, tributyltin chloride and dibutyltin dichloride, comprising contacting said mixture with methyl alcohol to dissolve the tributyltin chloride and dibutyltin dichloride and leaving the tetrabutyltin in a separate phase, and then separating the two phases to obtain the tetrabutyltin.

5. A process for separating tetraoctyltin from a mixture consisting essentially of tetraoctyltin, trioctyltin chloride and dioctyltin dichloride, comprising contacting said mixture with methyl alcohol to dissolve the trioctyltin chloride and dioctyltin dichloride and leaving the tetraoctyltin in a separate phase, and then separating the two phases to obtain the tetraoctyltin.

6. A process for separating tetraphenyltin from a mixture consisting essentially of tetraphenyltin, triphenyltin chloride and diphenyltin dichloride, comprising contacting said mixture with methyl alcohol to dissolve the triphenyltin chloride and diphenyltin dichloride and leaving the tetraphenyltin in a separate phase, and then separating the two phases to obtain the tetraphenyltin.

7. A process for separating a bis trihydrocarbontin oxide from a mixture consisting essentially of a bis trihydrocarbontin oxide and a tetrahydrocarbontin wherein the hydrocarbon group is selected from the group consisting of alkyl and aryl radicals having 2 to 18 carbon atoms, comprising contacting said mixture with methyl alcohol resulting in the solution of the bis trihydrocarbontin oxide in the methyl alcohol, and the tetrahydrocarbontin remaining in a separate phase, removing the methyl alcohol solution and recovering the bis trihydrocarbontin oxide therefrom.

8. A process for separating a bis trihydrocarbontin oxide from a mixture consisting essentially of a bis trihydrocarbontin oxide, a tetrahydrocarbontin and a dihydrocarbontin oxide wherein the hydrocarbon group is selected from the group consisting of alkyl and aryl radicals having 2 to 18 carbon atoms, comprising contacting said mixture with methyl alcohol resulting in the solution of the bis trihydrocarbontin oxide in the methyl alcohol, and the tetrahydrocarbontin and dihydrocarbontin oxide remaining in a separate phase, removing the methyl alcohol solution and recovering the bis trihydrocarbontin oxide therefrom.

9. A process for separating bis tributyltin oxide from a mixture consisting essentially of bis tributyltin oxide, tetrabutyltin and dibutyltin oxide, comprising contacting said mixture with methyl alcohol resulting in the solution of the bis tributyltin oxide in the methyl alcohol, and the tetrabutyltin and dibutyltin oxide remaining in a separate phase, removing the methyl alcohol solution and recovering the bis tributyltin oxide.

10. A process for separating bis trioctyltin oxide from a mixture consisting essentially of bis trioctyltin oxide, tetraoctyltin and dioctyltin oxide, comprising contacting said mixture with methyl alcohol resulting in the solution of the bis trioctyltin oxide in the methyl alcohol, and the tetraoctyltin and dioctyltin oxide remaining in a separate phase, removing the methyl alcohol solution and recovering the bis trioctyltin oxide.

11. A process for separating triphenyltin hydroxide from a mixture consisting essentially of triphenyltin hydroxide, tetraphenyltin and diphenyltin oxide, comprising contacting said mixture with methyl alcohol resulting in the solution of the triphenyltin hydroxide in the methyl alcohol, and the tetraphenyltin and diphenyltin oxide remaining in a separate phase, removing the methyl alcohol solution and recovering triphenyltin hydroxide.

12. A process for separating a mixture consisting essentially of at least one compound selected from the first group consisting of $R_3SnCl$, $R_2SnCl_2$, $RSnCl_3$, $R_3SnOH$, and $(R_3Sn)_2O$ and at least one composition selected from the second group consisting of (i)$R_4Sn$ and (ii)$R_4Sn$ together with $R_2SnO$, wherein R is a hydrocarbon radical selected from the group consisting of alkyl and aryl radicals having 2 to 18 carbon atoms which comprsises contacting said mixture with methyl alcohol thereby forming an alcoholic layer containing the compound of said first group and a non-alcoholic layer containing the composition of said second group, and separating said alcoholic layer containing the compositions of the first group from said non-alcoholic layer containing the compounds of the second group.

References Cited by the Examiner

UNITED STATES PATENTS 2,868,820   1/59   Nitzsche et al. _____ 260—429.7
2,957,785  10/60   Leatherland _____ 260—429.7

OTHER REFERENCES

Hein et al.: "Z. Anorg. Chem." 145, 95–126 (pp. 111–112 needed) 1925.

Harada: "Sci. Papers Inst. Phys. & Chem. Research" (Tokyo), 35 pp., 290–329 (pp. 303–304 needed), 1939.

TOBIAS E. LEVOW, *Primary Examiner.*

ABRAHAM H. WINKELSTEIN, *Examiner.*